US006803885B1

(12) United States Patent
Guttag et al.

(10) Patent No.: US 6,803,885 B1
(45) Date of Patent: Oct. 12, 2004

(54) METHOD AND SYSTEM FOR DISPLAYING INFORMATION USING A TRANSPORTABLE DISPLAY CHIP

(75) Inventors: Karl M. Guttag, Plano, TX (US); Gerald D. Rogers, Dallas, TX (US); Ronnie N. Dunn, McKinney, TX (US); Patrick R. Antaki, Plano, TX (US)

(73) Assignee: Silicon Display Incorporated, Richardson, TX (US)

( * ) Notice: Subject to any disclaimer, the term of this patent is extended or adjusted under 35 U.S.C. 154(b) by 0 days.

(21) Appl. No.: 09/337,411

(22) Filed: Jun. 21, 1999

(51) Int. Cl.$^7$ .............................................. G09G 5/00
(52) U.S. Cl. .......................................................... 345/8
(58) Field of Search ............................. 345/8, 7, 9, 55, 345/205, 204, 93, 91, 88, 89; 359/630, 631, 632, 633

(56) References Cited

U.S. PATENT DOCUMENTS

| | | | |
|---|---|---|---|
| 4,648,045 A | 3/1987 | Demetrescu | 364/518 |
| 4,720,819 A | 1/1988 | Pinkham et al. | 365/219 |
| 4,959,811 A | 9/1990 | Szczepanek | 365/49 |

(List continued on next page.)

FOREIGN PATENT DOCUMENTS

| | | | | |
|---|---|---|---|---|
| EP | 0 631 271 A1 | 12/1994 | | G09G/3/36 |
| JP | 09 212140 | 8/1997 | | G09G/3/36 |
| WO | 9607947 A1 | 3/1996 | | G02B/27/01 |
| WO | 97/04436 | 2/1997 | | G09G/3/36 |
| WO | WO 97/04436 | 6/1997 | | G09G/3/36 |
| WO | WO 00/79510 | 12/2000 | | G09G/3/36 |

OTHER PUBLICATIONS

International Search Report in International Application No. PCT/US 00/17164, dated Jun. 21, 2000, 7 pages, Sep. 27, 2000.
U.S. Patent Application entitled *Display System with Multiplexed Pixels* filed Aug. 5, 1999. Inventors: William A. Quanrud, et al, San Jose, California, Nov. 15, 2001.
U.S. Patent Application entitled *Display System with Multiplexed Pixels* filed Aug. 5, 1999. Inventors: William A. Quanrud, et al, San Jose, California.
Inventors comments entitled "A List of What I Believe to Be Problems With SDI's U.S. patent application 09/337411," by Karl M. Guttag Jun. 25, 2003.
Le, T.M., et al., "SIMD Processor Arrays for Image and Video Processing: A Review", *Proc. Electronic Imaging Symposium –Multimedia Hardware Architectures'98*, San Jose, Jan. 1998.

*Primary Examiner*—Richard Hjerpe
*Assistant Examiner*—Ronald Laneau
(74) *Attorney, Agent, or Firm*—Baker Botts L.L.P.

(57) ABSTRACT

A system for displaying information using a display chip (1) is disclosed. The display system comprises a controller array (24) operable to send image data to a display array (30). The display array (30) has a plurality of pixels (96) with each pixel (96) having at least two memory storage bits per pixel (92, 94).

28 Claims, 4 Drawing Sheets

U.S. PATENT DOCUMENTS

| | | | | |
|---|---|---|---|---|
| 5,210,705 A | | 5/1993 | Chauvel et al. | 364/572 |
| 5,210,836 A | | 5/1993 | Childers et al. | 395/375 |
| 5,293,482 A | * | 3/1994 | Lambidakis | 345/534 |
| 5,339,116 A | | 8/1994 | Urbanus et al. | 348/716 |
| 5,757,339 A | * | 5/1998 | Williams et al. | 345/8 |
| 5,764,202 A | * | 6/1998 | Welch et al. | 345/8 |
| 5,767,828 A | | 6/1998 | McKnight | 345/89 |
| 5,784,073 A | | 7/1998 | Yamazaki et al. | 345/511 |
| 5,815,126 A | * | 9/1998 | Fan et al. | 345/8 |
| 5,850,489 A | * | 12/1998 | Rich | 382/304 |
| 5,903,395 A | * | 5/1999 | Rallison et al. | 345/8 |
| 5,945,972 A | | 8/1999 | Okumura et al. | 345/98 |
| 5,956,274 A | | 9/1999 | Elliott et al. | 365/189.04 |
| 5,959,598 A | | 9/1999 | McKnight | 345/90 |
| 6,034,653 A | * | 3/2000 | Robertson et al. | 345/8 |
| 6,040,812 A | * | 3/2000 | Lewis | 345/89 |
| 6,046,712 A | * | 4/2000 | Beller et al. | 345/8 |
| 6,140,983 A | | 10/2000 | Quanrud | 345/55 |
| 6,144,356 A | | 11/2000 | Weatherford et al. | 345/100 |
| 6,188,377 B1 | | 2/2001 | Campbell et al. | 345/98 |
| 6,339,417 B1 | | 1/2002 | Quanrud | 345/98 |
| 6,369,832 B1 | | 4/2002 | McKnight | 345/691 |
| 6,373,497 B1 | | 4/2002 | McKnight et al. | 345/602 |
| 6,452,589 B1 | | 9/2002 | McKnight | 345/205 |

* cited by examiner $(R_5G_6B_5)_1\ (R_5G_6B_5)_2\ (R_5G_6B_5)_3 \ldots (R_5G_6B_5)_{\text{last pixel}}\ \text{---}\!>\!>\!>$ /–33

$R_1R_1R_1 \ldots R_{\text{last pixel}},\ G_1G_1G_1 \ldots G_{\text{last pixel}},\ B_1B_1B_1 \ldots B_{\text{last pixel}}\ \text{---}\!>\!>\!>$ /–34

$(r_1r_2r_3 \ldots r_{\text{last pixel}})_{\text{msb}};(r_1r_2r_3 \ldots r_{\text{last pixel}})_{\text{msb}-1} \ldots (g_1g_2g_3 \ldots r_{\text{last pixel}})_{\text{msb}};$ /–35

$(g_1g_2g_3 \ldots r_{\text{last pixel}})_{\text{msb}-1} \ldots (b_1b_2b_3 \ldots b_{\text{last pixel}})_{\text{msb}};(b_1b_2b_3 \ldots r_{\text{last pixel}})_{\text{msb}-1} \ldots$

*FIG. 5*

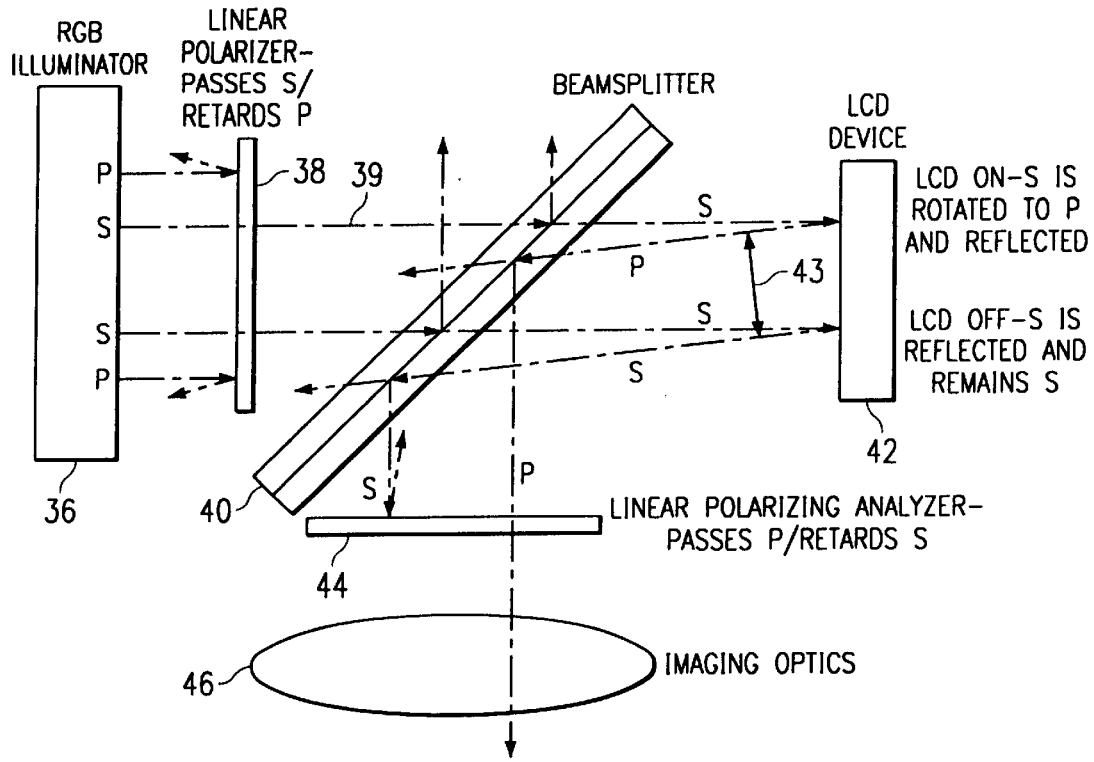

*FIG. 6*

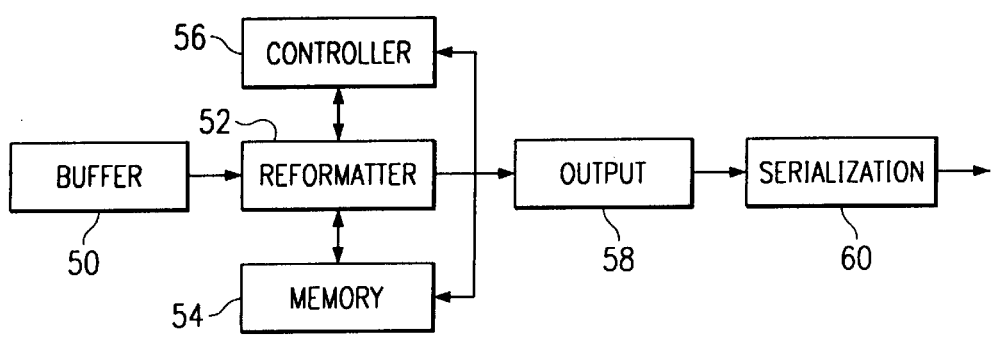

METHOD AND SYSTEM FOR DISPLAYING INFORMATION USING A TRANSPORTABLE DISPLAY CHIP

TECHNICAL FIELD OF THE INVENTION

This invention relates to electronic systems and more specifically to a method and system for displaying information using a transportable display chip.

BACKGROUND OF THE INVENTION

The use of computers in our daily lives is steadily increasing. In fact, many people find it necessary to have computers with them when they travel so they can work while traveling on airplanes, trains, buses and even in their cars. Technology has increased to such an extent that where a portable computer of a few years ago weighed many pounds and had a very small and hard to read screen; the portable computer of today, such as a laptop or a personal digital assistant, weighs only a few pounds and may have large color displays. However, even these modern day computers suffer from some drawbacks. The displays, while larger and able to display color better than in the past, are hard to work with while trying to type on a plane, a train or on a bus. People seated near the user can see what the user is doing. The screens also require a lot of energy to power them Different ways to address this problem have been suggested. Some ways involve increasing the battery life of current laptops. This, however, does not solve the problems of using bulky screens while working on a plane or other cramped situations. Other ways involve using a display that can be mounted as goggles or eyeglasses. These displays tend to be bulky and do not work efficiently.

What is needed is a display system which while, small in size, appears to be large to the user and which will operate in a very efficient manner.

SUMMARY OF THE INVENTION

Accordingly, it may be appreciated that a need has arisen for a method and system for displaying information using a transportable display chip in accordance with the teachings of the present invention. A transportable display chip is provided which substantially eliminates or reduces the disadvantages and problems associated with current display schemes.

In one embodiment of the present invention a system for displaying information using a display chip is disclosed. The system includes a controller array operable to send image data to a display array which is operable to display an image based on receiving the data. The display array also is comprised of a plurality of pixels, with each pixel having a memory operable to store more than one bit. In another embodiment, a display cell is disclosed. The display cell comprises a cell memory operable to store at least two bits of information, the memory cell is coupled to a display.

The present invention provides various technical advantages over current display schemes. For example, one technical advantage is that a plurality of bit values may be stored at the pixel itself. Another technical advantage is that bit values can be manipulated at or near the pixel. Other technical advantages may be readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, in which like reference numbers represent like parts, in which:

FIG. 5 illustrates the conversion between RGB color sequential format to color bit sequential format;

FIG. 6 illustrates the operation of a liquid crystal display in accordance with the teachings of the present invention;

FIG. 7 illustrates a block diagram of the control chip;

DETAILED DESCRIPTION OF THE INVENTION

Figure 1:
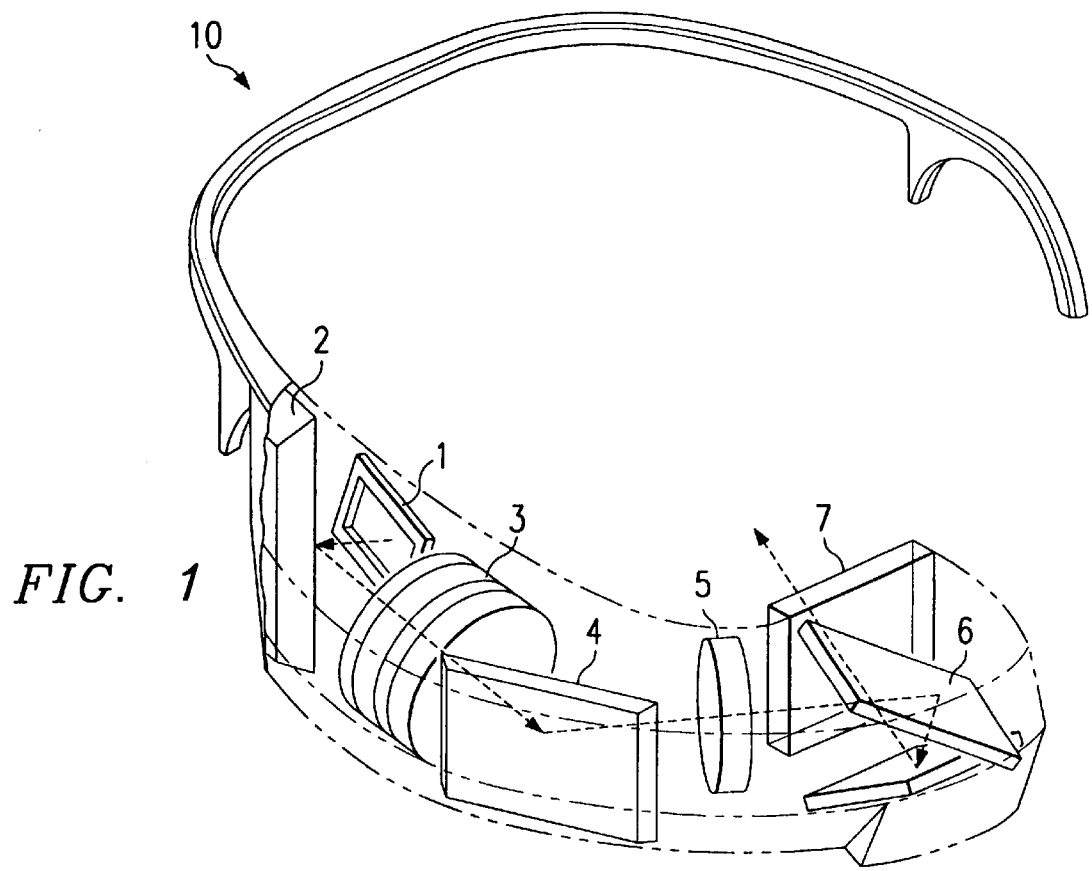
FIG. 1 is a cutaway view of a display headset.

FIG. 1 illustrates a cutaway view of an exemplary display headset 15 in accordance with the teachings of the present invention. Display headset 15 comprises a display chip 1, the image of which is reflected by a first mirror 2 through a first lens series 3 to a second mirror 4. The image is then reflected through a second lens 5 through a third mirror series 6 and finally through viewing optics 7 in such a way as the image of display chip 1 is presented to the eye of the user. The number and placement of optics and mirrors are for exemplary purposes only. The optics and mirrors shown in FIG. 2 can be configured in any number of arrangements as long as an image of display chip 1 is properly presented to a user.

Figure 2:
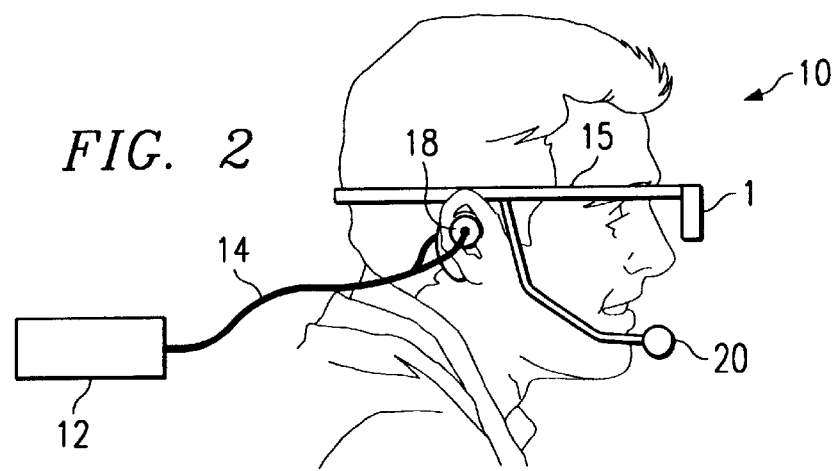
FIG. 2 illustrates a display system in accordance with the teachings of the present invention.

FIG. 2 illustrates a display system 10 in accordance with the teachings of the present invention. A conventional computer 12 connects to a headset 15 by a serial bus 14. Display chip 1 is incorporated into headset 15. Also illustrated are an ear piece 18 and a microphone 20.

In operation, a person would be operating computer 12. Computer 12 can be any conventional computer, laptop, personal digital assistant (PDA) or other computing device. Computer 12 outputs video signals to serial bus 14. These video signals are typically outputted in a serial format. Video signals are decoded and displayed on display chip 1. Because of the optical system involved, display chip 1 appears to the user as much larger than the actual size of display chip 1. For example, display chip 1 can appear to a user to be a 17 or a 21-inch monitor, even though the size of the actual display chip 1 is much smaller. Also provided is an ear piece 18 operable to receive audio signals from computer 12. Audio signals are sent via serial bus 14 along with the video signal. Microphone 20 is provided so that a user can send voice commands to computer 12 for voice control of programs or voice dictation. Voice commands travel back to computer 12.

While the previous figures discussed the use of display chip (1) as a computer display, it is understood that such a display chip can be used as a display mechanism for any type of audio/video display such as television broadcast or video replay.

Figure 3:
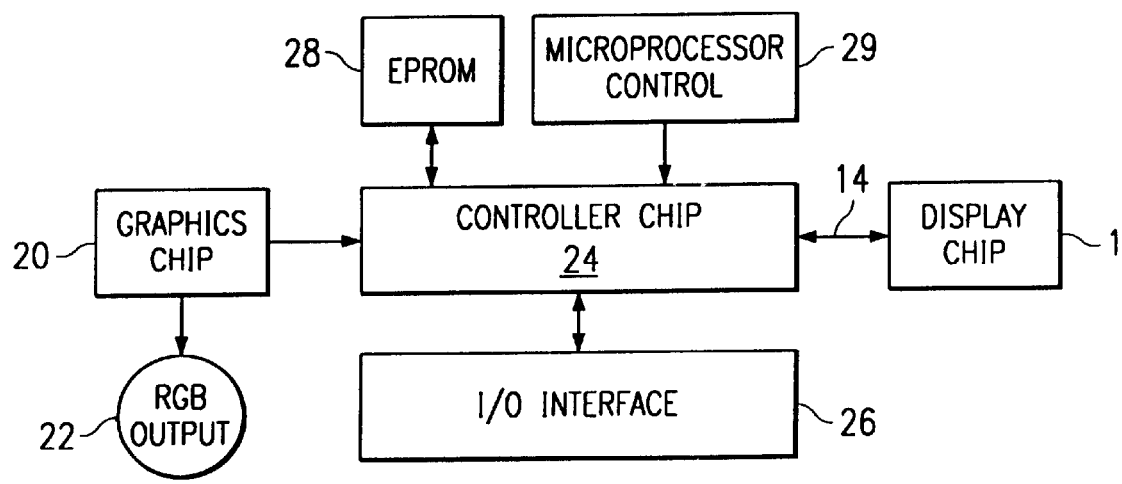
FIG. 3 is a block diagram illustrating the display system of the present invention.

FIG. 3 is a block diagram illustrating display system 10 in accordance with the teachings of the present invention. Illustrated is a graphic chip 20 coupled to a controller chip 24 and an RGB output 22. Controller chip 24 couples to display chip 1 via serial bus 14. An input/output interface 26 couples to controller chip 24. An EPROM 28 couples to controller chip 24.

Graphics chip 20, in an embodiment, comprises a conventional graphics adapter chip typically found in the video display card for computer 12. According to one embodiment, graphic chip 20 is operable to produce a resolution of at least 1,024 pixels by 768 pixels with at least 65,536 colors available for each pixel. In order to display 65,536 colors, each pixel requires 16 bits of color information. A 16-bit pixel comprises five bits of red, six bits of green, and five bits of blue information. This translates into thirty-two shades of red, sixty-four shades of green, and thirty-two shades of blue per pixel. The number of shades of green is higher because the human eye notices more variations in the color green than in the colors red or blue. Graphics chip 20 is typically found inside computer 12 and is provided with video memory and a video processor.

Video output 22 feeds the output of graphics chip 20 to an external monitor (not pictured). For VGA (video graphics array) resolution and higher resolution monitors, video output is a 15-pin output. Each color is sent over a separate wire and the intensity of each color is proportional to the digitally represented voltage.

Most display controllers, such as VGA, use output packed pixel formatted data. With the packed pixel format, value of the red, green, and blue intensities are presented simultaneously to the display device. A packed pixel image can be thought as being a single X and Y array with N-bits of data representing the color at a given location in the array.

In contrast to the packed pixel format, there is also a bit plane format. The "bit plane" format can be thought of as having a series of X by Y 1-bit per pixel images or "planes." To get a color display requires multiple bit planes.

While for the same resolution and color content, packed pixel and bit plane formats require exactly the same amount of data, the data is organized differently. In packed pixel there is a single array with multiple bits per element in the array. With bit plane format, there is are multiple arrays with each element in each array being one bit.

Controller chip 24 is operable to convert packed RGB format information from graphics chip 20 to a bit plane format for presentation to display chip 1. As noted previously, RGB data per pixel in one embodiment is sixteen bits of data, comprising five bits of red data, six bits of green data and five bits of blue data. Conventionally with displays such as CRTs, this packed pixel data is applied to one pixel at a time in the display Controller chip 24 is operable to take RGB packed format and convert it into bit color sequential format. Bit plane sequential format breaks up each packed pixel into individual bit values and sends those one at a time. This operation is explained further in conjunction with FIGS. 4 and 5. Controller chip 24 may convert parallel information to a single serial stream carried over one wire or may convert parallel information to a partial serial stream comprised of some amount of wires less than the original amount.

Figure 4:
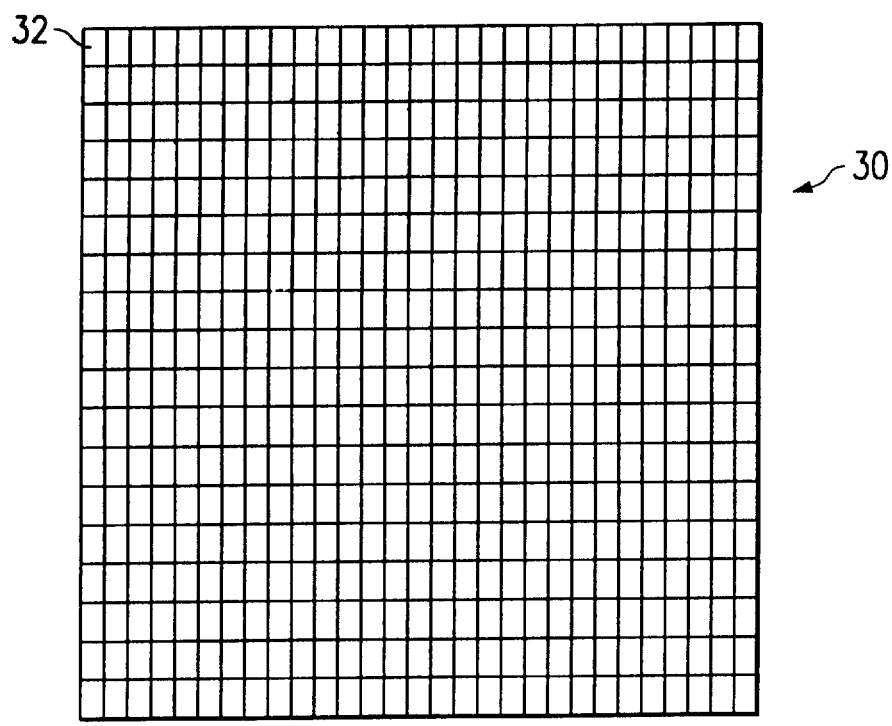
FIG. 4 illustrates a display having individual pixels.

Turning to FIG. 4, illustrated is a display 30 having individual pixels 32. As indicated before, in one embodiment, each pixel has a sixteen-bit color value comprising five bits of red color data, six bits of green color data and five bits of blue color data. In a 1,024 pixels by 768 pixels display, there will be a total of 786,432 pixels. Each pixel has a unique RGB value. Of course, display 30 is not static. In fact, in one embodiment, a display changes every sixtieth of a second. This is known as one frame. As discussed previously, in a sixteen-bit color scheme, there are thirty-two shades of red, sixty-four shades of green and thirty-two shades of blue. When that information is sent to a single pixel, a certain color that is a combination of the red, green and blue shades is produced. As an example, assume that pixel one has a certain RGB value where the red value is a seventeen out of a possible thirty-two, the green value is a forty-four out of a possible sixty-four, and the blue value is a twenty-three out of a possible thirty-two. This combination would produce a certain color in that first pixel. The next pixel may have a different value. For example, it may have a twenty-one out of thirty-two for its red value, a thirty-seven out of sixty-four for its green value, and a thirty out of thirty-two for its blue value. This would continue on for the other 786,430 pixels.

The red, green and blue values of a pixel are first expressed in binary form. For example, for the first pixel, the red value of seventeen is represented by the binary number 10001. Note that this is a five-bit number. The green value of forty-four is represented by the binary number 101100, a six-bit number. The blue value of twenty-three is represented as the binary number 10111. The second pixel in the example has a red value of 10101, a green value of 100101, and a blue value of 11110. Bit plane format takes the most significant bit of a first color, for example red, for every single pixel. The most significant bit in a binary number is the left-most bit. In this example, the most significant bit for the red value of pixel is a one. The most significant bit for pixel two for the red value is also a one. All of the most significant bits for that color will then be collected from the first pixel to the last pixel which, in one embodiment, is pixel number 786,432. Because of the nature of the binary number, the most significant bit value is always one-half of the potential maximum value. Therefore, if a one exists in the most significant bit for a color, that color will be displayed for one-half of the display time for that particular pixel. In our example, pixel one would display red for one-half of the display rate for pixel one and pixel two. If a zero is the most significant bit for the red value, then nothing would be displayed for that time period. After all of the most significant bits for that color value are displayed, the second most significant bit is displayed.

In our example, the most significant bit minus one for the red value for pixel one is zero and the most significant bit for the red value pixel for pixel two is also zero. In a five-bit number, the most significant bit minus one is one-fourth of the maximum value of that five bit number. Therefore, if a one appears in the most significant minus one of the five bit red value, a red value would be displayed for one-fourth of the entire time the frame is displayed. This process continues until all five bits of red values are displayed. Then, green colors are displayed, starting with the most significant bit for green values and going all the way to the most significant bit minus five, since green is represented by a six-bit number. Again, if the most significant bit is a one for a green value, it would display a green value in that pixel for one-half of the amount of time the frame is displayed. If it was the most significant bit minus one, it will be displayed for one-fourth the time the frame is displayed, and so on. Next, the blue values are shown, starting with the most significant bit of the blue value and going on to the most significant bit minus four, since blue value is a five-bit value. The human eye's response time is much smaller than the rapidly changing pixel. Therefore, the eye integrates the time sequential coloring into one mixed color. While in the discussion above, the bit planes are presented in order of all the red, all the green, and then all the blue, it should be understood that the bit planes can be presented to the eye in any order. The human eye will still integrate the colors.

FIG. 5 illustrates the conversion between an RGB format to bit color sequential format. Red, green and blue value for each pixel one converts to bit color sequential format comprising the most significant bit value for each color for each pixel, the most significant bit value minus one for each color for each pixel in such a way as all the color values are broken down to their bit value and either grouped by color in bit value or by bit value or by a combination. The order can be rotated in any order and the eye will still mix the colors and see it as a certain color shade.

Referring back to FIG. 3, input/output interface 26 couples to ear piece 18 and microphone 20. Input/output interface 26 allows audio signals to pass to the controller chip and to be mixed in with visual signals from graphic chip 20 and travel along serial bus 14 to ear piece 18 as illustrated in FIG. 1. Microphone 20, as illustrated in FIG. 1, can collect information spoken by the user and transfer that information back down the serial bus 14 through controller chip 24, through input/output buffer 26 and back to the computer to allow voice commands, communication, and dictation.

EPROM 28 allows for configuration information to be stored and updated easily. Such configuration information may include what resolution to display on display chip 1. Resolution means horizontal or vertical resolution as well as the color depth of display. For example, instead of displaying 1,024 pixels by 768 pixels, the display could instead display 640 pixels by 480 pixels with a color depth of 256 colors. Other configuration information could include the bit order to be sent to display chip 1. Bit order would be whether or not all red values are sent at once or red values are to be followed by green values, or a combination of the above. EPROM 28 can be any programmable memory that can be erased and changed including conventional erasable programmable read only memories, flash memory, or any other ways of configuring controller chip 24.

Instead of EPROM 28, software control via a microprocessor 29 may be provided. The software would provide the same information as the EPROM 28 but can change that information as necessary, on the fly.

Serial bus 14 comprises a thin wire designed to carry signals from controller chip 24 to display chip 1. Serial bus 14 is thinner than a typical monitor cable for a VGA resolution monitor. Serial bus 14 can be thinner because the information traveling from controller chip 24 to display chip 1 travels in digital low voltage swing format rather than analog format. Serial bus 14 can be any number of wires ranging, in one embodiment, from one to sixteen wires.

Display chip 1 is a display device capable of displaying the information generated by controller chip 24. In one embodiment, display chip 1 includes a ferromagnetic liquid crystal display (LCD). Display chip 1 can also comprise an array of mirrors as a display.

FIG. 6 illustrates the operation of an exemplary liquid crystal display in accordance with the teachings of the present invention. A light source 36 is provided. In one embodiment, light source 36 consists of separate red, green and blue light sources. Light source 36 may be a white light source, coupled to a rotating color wheel, colored light emitting diodes (LEDs), or any other suitable monochromatic or color light source. The light from light source 36 passes through a polarizer 38 which allows only allows light of a certain alignment (polarization) to pass through. Light of all other alignment is blocked. The result is the light that passes through polarizer 38 is now aligned in a single direction.

Polarized light 39 passes from polarizer 38 to a beam splitter 40 which passes a portion of the light to a liquid crystal device 42.

Liquid crystal device 42 consists of, in one embodiment, molecules of liquid crystal material sandwiched between plates of glass. Typically, the glass is divided up into cells, each cell representing a single pixel. When a charge is applied to the liquid crystal molecules, they begin to contract and form spirals. The greater the charge, the tighter the spiral. At a maximum charge, the molecules are oriented ninety-degrees from their original orientation. The molecules in uncharged cells are left in the original orientation. Light then passes through the liquid crystal cells. The light will follow the alignment of the liquid crystal molecules in a cell. The result is that light passing through a charged cell will be twisted ninety degrees from its original polarization while light passing through an uncharged cell will stay at the same polarization. In the example of FIG. 6, LCD device 42 is a reflective device having a reflective layer behind the liquid crystal cells that will reflect the light out of liquid crystal device 42 once it passes through the liquid crystal cell.

Reflected light 43 then passes to beam splitter 40 where a portion is reflected to linear polarizing analyzer 44. The polarizing analyzer is designed to let only the light aligned in the same direction as that emerging from an active liquid crystal display cell to pass through. All other light is blocked. The passed light is the viewed via viewing optics 46.

Referring back to FIG. 3, in operation of the system of the present invention, data for each frame of a display is received by control chip 24 from graphics chip 20. Control chip 24 converts the packed RGB format into a bit plane sequential format for transmission along serial bus 14. Therefore, information regarding the most significant bit for either the red, green or blue color is transferred along serial bus 14 to display chip 1. If, for example, the first color to be sent is red, the most significant bit of each pixel will be either a one or a zero. A one would indicate that particular pixel of display chip 1 will reflect light and zero would cause the pixel not to reflect light. Display chip 1 will activate or deactivate each pixel for a set period of time based on whether or not a one or a zero is the most significant bit for the red color sent to display chip 1. A red light, preferably from a red LED or some other type of light, is simultaneously shining upon display chip 1. Whether or not light is reflected back to the user of display chip 1 depends on whether or not a pixel is activated. After the set time for the most significant bit of that red color is expired, either the next most significant bit of red is sent or some other color value is sent to display chip 1 and the process continues. A frame is complete when all of the red, green and blue colors have been sent and displayed on display chip 1. Again, because of the response time of the eye, the colors are integrated by the eyes and the brain such that there appears to be one mixed color.

FIG. 7 illustrates a block diagram of control chip 24. Control chip 24 comprises an input buffer 50 coupled to a reformatter 52. Reformatter 52 is coupled to a memory 54 for both input and output. Reformatter 52 is also coupled to a controller 56 where controller 56 is also independently coupled to memory 54. Reformatter 52 outputs data to an output buffer 58 which then outputs to a serialization buffer 60. The data is then output to display chip 1 via serial bus 14.

Input buffer 50 buffers the input to the reformatter 52. The input of input buffer 50 is from graphics chip 20 and may comprise signals sent in RGB format. The RGB format is then transmitted to reformatter 52 and is stored in memory 54. Memory 54 is operable to hold a fixed number of pixels values. In one example, memory 54 can hold sixteen pixel values at once. Therefore, memory 54 would be a sixteen bit by sixteen bit memory array. This means that the sixteen-bit value for the RGB values would be stored in one direction across where sixteen different pixel values are stored in each row. Reformatter 52 is operable to read out the bit color sequential format from those sixteen stored values and output them to output buffer 58. Output buffer 58 then outputs it to serialization buffer 60. Serialization buffer 60 receives the values from output buffer 58 and then transmits the data in serial fashion along serial bus 14. As mentioned before, serial bus 14 may be more than one wire, thus serialization 60 is operable to divide up the bit color sequential format among one or more wires which are then sent to display chip 1. Controller 56 may comprise a programmable state machine operable to control the reformatter 52 and the operation of memory 54.

Figure 8:
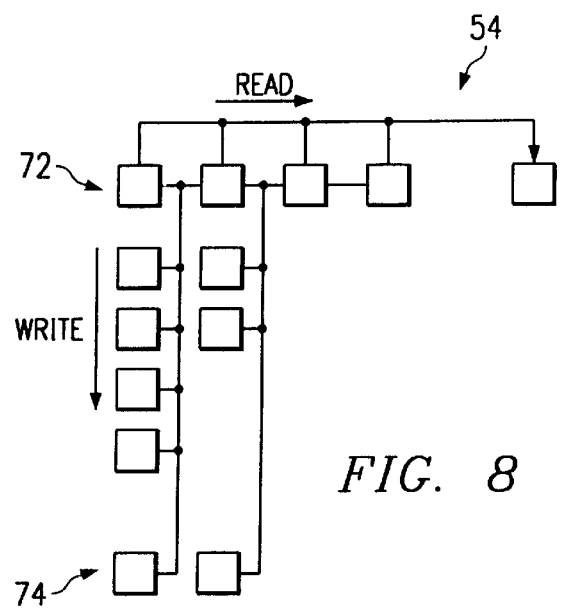
FIG. 8 illustrates an exemplary memory matrix.

FIG. 8 illustrates an exemplary memory matrix 54. Memory 54 is a sixteen by sixteen-memory matrix. Pixel values are read into the matrix one row at a time. For example, the first pixel would be read in across row 72. In one embodiment, the first five values comprise the five-bit red value, the next six values comprise a six-bit green value, and the last five values comprise the five-bit blue value. The next row 74 contains the next pixel information. Again, it is comprised of the first five red values, the next six green values and the next five blue values. Memory 54 contains similarly formatted data associated with sixteen pixels. For example, in the previous example pixel one had a red value of 10001, a green value of 101100 and a blue value of 10111. As can be seen in row 72, this number has been entered into each one of the sixteen bits starting with the first five bits of red color 10001, the next six-bit green value 101100 and the last five-bit blue value 10111. Row 74 has the next pixel bit value entered in, which from our previous example, would be 1010110010111110. This would continue until sixteen pixel values are loaded in memory 54.

In order to read the bit color sequential values out from this arrangement, a column is read out of the memory cell. For example, column one will be the most significant red bit from each of the first sixteen pixels. Column two is the most significant red bit minus one, column three is the most significant red bit minus three, column five is the most significant red bit minus five, column six is the most significant green bit, column twelve is the most significant blue bit and column sixteen is the most significant blue bit minus four. Therefore, by reading the columns one at a time from left to right, RGB sequential format is converted to bit color sequential format. Once all the columns are read out of memory 54, input buffer 50 and reformatter 52 will fill memory cell 54 with sixteen more pixel values which are then sent via reformatter 52 to output 58. This will continue until all pixels are read for each frame. In one embodiment, there are 768,432 pixels for each frame of information.

Figure 9:
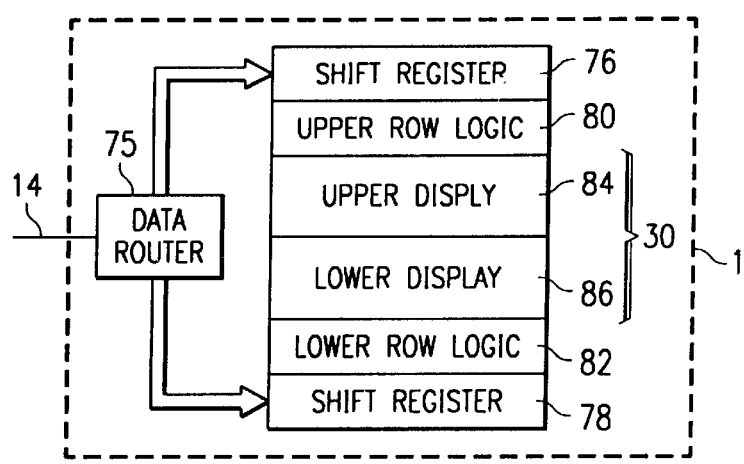
FIG. 9 is a schematic drawing of the display chip.

FIG. 9 is a schematic diagram of display chip 1. Display chip 1 comprises a data router 75 which receives data (bit values) from controller chip 24 via serial line 14. The display array 30 can be split into two sections (butterflied) such that an entire array can be read to in half the usual number of cycles. For example, if display array 30 has 768 rows it can be butterflied into two 384 rows sections. The display has an upper shift register 76 and a lower shift register 78 coupled to an upper display 84 and a lower display 86 (which together comprise display array 30). Upper display 84 is associated with an upper row logic 80 and lowers display 86 is associated with lower row logic 78.

In operation, data is received at data router 75. Data router 75 then sends bit values to upper shift register 76 and lower shift register 78. These shift registers load a row of data at a time into upper display 84 and lower display 86. Data bits can be sent from upper display 84 and lower display 86 to upper row logic 80 and lowers row logic 82 for processing. One example of processing would be to take the bit value that was just displayed, send it to one of the row logics, invert the value in the row logic and send the value back to the display to be displayed. This process is done to keep the LCD material from staying in one state. Other, more sophisticated processing is also possible.

Figure 10:
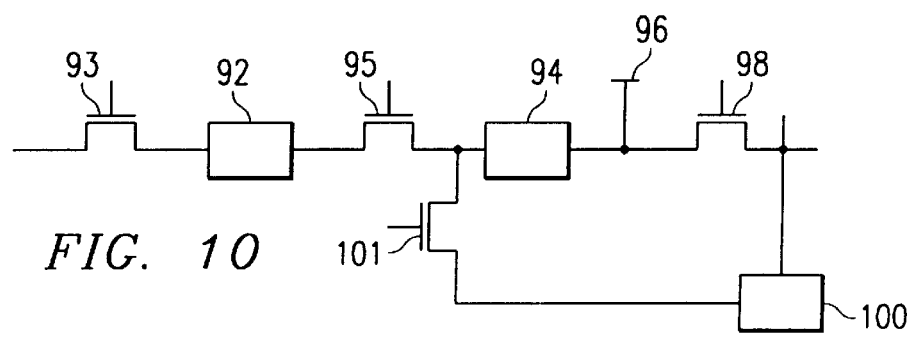
FIG. 10 is a diagram of one embodiment of a display circuit for one pixel of the display chip.

FIG. 10 illustrates a block diagram of one embodiment of a display circuit for one pixel of the display chip in accordance with the teachings of the present invention. Display circuit 90 comprises a load memory cell 92 coupled to a display memory cell 94. Display memory cell 94 is coupled to a pixel 96 of the display chip 1. A readout 98 is provided to read the bit value currently being displayed at pixel 96. Readout 98 is coupled to a logic arrangement 100. In one embodiment logic arrangement 100 is a bit inverter. Logic arrangement 100 may also be operable to perform any of a number of image processing techniques. The output of logic arrangement 100 may be loaded into display memory cell 94 via load signal 95 for display at pixel 96.

Load memory cell 92 and display memory cell are shown associated with a given pixel 96. This is only one possible embodiment. The load memory cell 92 and display memory cell 94 either together or individually may be associated with a different pixel in an array. Load memory cell 92 and display memory 94 may be stored under an array of pixel, outside the array of pixels or in some combination.

In operation, a first bit value is loaded, via load signal 93 or from a shift register from serial bus 14, to load memory 92. When a second bit value is loaded, the first bit value is stored in display memory 94 while the second bit value is stored in load memory 92. A pixel load signal 95 causes the bit value stored in display memory 94 to be outputted to pixel 96. The bit value is either a logical one or zero. As discussed earlier, depending on the value of the bit, the LCD pixel will either polarize the incoming light or leave it unchanged. This has the effect of controlling the pixel's on or off state. The repolarized light is transmitted, via a polarizer, to the viewing optics.

The value displayed at the pixel can be read at read line 98. This value can then pass to logic arrangement 100. In one embodiment, logic arrangement inverts the received bit and sends that value back to pixel 96. The inverse of a displayed bit needs to be displayed because most LCD materials require "DC restoration" which mean the average DC value must be near zero on the cell to prevent the LCD material from staying in a twisted state. In other embodiments, logic arrangement can process bits, in other ways. Indeed, any number of complex logical or arithmetical operations could be implemented in logic arrangement 100. In one embodiment, the entire image may be stored within the pixels and processing can be done at display chip 1. Logic arrangement 100 can be combined with a register or other storage means. Logic arrangement 100 can also, in an embodiment, receive data from load memory 92. Logic arrangement may also return a processed bit to a different memory than the bit was originally associated with.

FIG. 10 illustrates an exemplary pixel setup for one pixel. As discussed previously, there are 786,432 pixels in a 1024 by 768 image array. Thus, the procedure discussed above occurs for multiple rows in an array. It is also possible to split the display into a first and a second subarray and address two rows per cycle.

While first memory 92 and second memory 94 in the example of FIG. 10 store one bit per memory, other arrangements are possible for storage purposes. For example, load memory 92 and display memory 94 could store multiple bits. One possible alternative is to have load memory 92 store multiple bits in a shift register.

Although the present invention has been described above in connection with several embodiments, it should be understood that changes, substitutions, variations, alterations, transformations and modifications may be suggested to one skilled in the art and the tenet of the present invention encompasses the changes, substitutions, variations, alterations, transformations and modifications as filed in the spirit and scope of the appending claims. For example, while exemplary discussions involved the use of LCD devices, digital mirror devices can also be used as a display device.

Additionally, while the preceding text discussed applications involving head mounted displays, the display cell and discussions here within are also applicable to other areas such as image projectors or flat screen displays.

What is claimed is:

1. A display device comprising:
   a controller chip comprising:
      a memory data array on the controller chip operable to store data values associated with an image to be displayed; and
      a controller on the controller chip operable to control transmission of the data values stored in the memory data array out of the memory data array and off the control chip;
   a display chip operable to receive the transmitted data values from the control chip and display the image, comprising:
      a display array comprising a plurality of pixels;
      a display chip memory operable to store at least two bits of data per pixel; and
      a logic arrangement within the display chip operable to retrieve values from the display chip memory, perform logical or arithmetic operations on the data values, and selectively transmit results back to the display chip memory;
   a data bus operable to carry the transmission of data values stored in the memory data array to the display chip; and
   wherein the logic arrangement on the display chip is operable to retrieve and transmit data values from and to the display chip memory over a link other than the data bus.

2. The system of claim 1, wherein a portion of the display chip memory is organized to fit substantially under the plurality of pixels of the pixel arrangement.

3. The system of claim 1, wherein a portion of the display chip memory bits is not under the display array.

4. The system of claim 1, wherein a portion of the display chip memory is operable to control at least one of the plurality of pixels on or off state.

5. The system of claim 1, wherein there are an integer number of storage bits physically associated with each pixel.

6. The system of claim 1, wherein multiple bits of memory may be placed under multiple pixels and wherein the ratio of bits per pixel may not be an integer number.

7. The system of claim 1, wherein the display chip memory comprises a shift register operable to store multiple memory bits per pixel.

8. The system of claim 1, wherein the display array is a liquid crystal display chip.

9. The system of claim 1, wherein the display array is mounted in a frame intended for headset use.

10. The system of claim 9, wherein the frame further comprises an earpiece mounted on the frame.

11. The system of claim 9, wherein the frame further comprises a microphone mounted on the frame.

12. The system of claim 1, wherein the arithmetic or logical operation is performed by logic directly associated with a given pixel.

13. The system of claim 1, wherein the arithmetic or logical operation involves selectively sending data values from one or more memory storage bits in the display chip memory to processing logic which can selectively send results to the same or other memory storage bits within the display chip memory.

14. The system of claim 1, wherein the logic arrangement can manipulate a portion of the display chip memory that control the pixels as a sequence of steps executed over multiple clock cycles.

15. The system of claim 1, wherein the logical operation is a DC restore.

16. The system of claim 1, wherein the logic arrangement comprises a separate logic circuit on the display chip for each pixel.

17. A system for displaying information on a display comprising:
   a data router operable to receive and send display data; and
   a display chip comprising a n-column by m-row pixel arrangement, having at least two bits of storage memory within the display chip for every pixel in the display, the display operable to receive display data from the data router, the display further comprising a logic arrangement within the display chip operable to retrieve data values from one or more of the bits of storage memory, perform logical or arithmetic operations on the data values, and selectively transmit results to one or more of the bits of storage memory.

18. The system of claim 17, further comprising a shift register operable to receive display data from the data router and present display data to the display one row at a time.

19. The system of claim 17, wherein the display is divided into an upper half and a lower half and there is a separate shift register for each half.

20. The system of claim 17, wherein there are two or more memory bits associated with each pixel and wherein the first bit is a display memory bit operable to store a bit value to be displayed and the second bit is a load bit memory operable to store one or more bits of data.

21. The system of claim 20, wherein the load bit will control the same pixel as the display bit.

22. The system of claim 20, wherein data stored in the load bit memory passes directly to the display bit memory.

23. The system of claim 20, wherein the data stored in the pixel memory controls the pixel the pixel memory is coupled to.

24. The system of claim 23, wherein the cell further comprises a logic circuit coupled to the pixel and operable to invert and display the last data value displayed by the pixel.

25. The system of claim 17, wherein the data stored in at least some of the memory bits are manipulated logically or arithmetically before controlling a pixel.

26. The system of claim 17, wherein the logic operation is an inversion of the data and the inverted data is redisplayed at the pixel.

27. The system of claim 17, further comprising at least one shared logic block operable to perform logic and arithmetic functions on the bit values stored in the pixel memory.

28. The system of claim 17, wherein the logic arrangement comprises a separate logic circuit on the display chip for each pixel.

* * * * *